(12) United States Patent
Arnold et al.

(10) Patent No.: US 9,607,159 B2
(45) Date of Patent: Mar. 28, 2017

(54) INTELLIGENT KEY SELECTION AND GENERATION

(71) Applicant: International Business Machines Corporation, Armonk, NY (US)

(72) Inventors: Todd W. Arnold, Charlotte, NC (US); Elizabeth A. Dames, Concord, NC (US); Charles D. Helfenberger, Charlotte, NC (US); Richard V. Kisley, Charlotte, NC (US); Jimmie R. Mayfield, Jr., Lexington, KY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 170 days.

(21) Appl. No.: 14/565,608

(22) Filed: Dec. 10, 2014

(65) Prior Publication Data
US 2016/0171221 A1 Jun. 16, 2016

(51) Int. Cl.
*G06F 21/60* (2013.01)
*H04L 9/14* (2006.01)
*G06F 21/72* (2013.01)
*H04L 9/08* (2006.01)
*G06F 21/46* (2013.01)

(52) U.S. Cl.
CPC .......... *G06F 21/602* (2013.01); *G06F 21/46* (2013.01); *G06F 21/72* (2013.01); *H04L 9/0861* (2013.01); *H04L 9/14* (2013.01); *G06F 2221/2107* (2013.01); *H04L 2209/24* (2013.01)

(58) Field of Classification Search
CPC ........ G06F 21/602; G06F 21/46; G06F 21/72; G06F 2221/2107; H04L 9/0861; H04L 9/14; H04L 2209/24
See application file for complete search history.

(56) References Cited

U.S. PATENT DOCUMENTS

| | | | | |
|---|---|---|---|---|
| 5,432,849 | A | * 7/1995 | Johnson | G06F 12/1408 380/280 |
| 6,307,936 | B1 | * 10/2001 | Ober | G06F 8/60 380/277 |
| 8,369,529 | B1 | 2/2013 | Agarwal et al. | |

(Continued)

OTHER PUBLICATIONS

List of IBM Patents or Patent Applications Treated as Related; (Appendix P), Filed Mar. 7, 2016; 2 pages.

(Continued)

*Primary Examiner* — Joseph P Hirl
*Assistant Examiner* — J. Brant Murphy
(74) *Attorney, Agent, or Firm* — Cantor Colburn LLP; Steven Chiu (57) ABSTRACT

A method, computer program product, and system for selecting and generating a key to perform a cryptographic operation are described. The method includes receiving one or more inputs representing criteria for the key, the one or more inputs excluding an explicit identification of the key and one of the one or more inputs specifying the cryptographic operation; retrieving, from a memory device, information corresponding with the one or more inputs; selecting and generating the key based on the one or more inputs and the information; and performing the cryptographic operation using the key.

19 Claims, 6 Drawing Sheets

(56) References Cited

U.S. PATENT DOCUMENTS

| | | | | |
|---|---|---|---|---|
| 2004/0039925 | A1* | 2/2004 | McMillan | H04L 63/06 713/189 |
| 2008/0089514 | A1* | 4/2008 | Futa | H04L 9/14 380/44 |
| 2009/0144553 | A1* | 6/2009 | Stafford | G06F 21/31 713/182 |
| 2011/0258430 | A1* | 10/2011 | Luukkala | H04L 9/3073 713/150 |
| 2012/0087494 | A1* | 4/2012 | Spalka | H04L 9/0825 380/46 |
| 2012/0131354 | A1* | 5/2012 | French | G06F 21/602 713/189 |
| 2012/0134492 | A1 | 5/2012 | Liu | |
| 2012/0307998 | A1 | 12/2012 | Arnold et al. | |
| 2012/0311324 | A1 | 12/2012 | Arnold et al. | |
| 2013/0044880 | A1 | 2/2013 | Arnold et al. | |
| 2014/0013122 | A1 | 1/2014 | Arnold et al. | |
| 2014/0369501 | A1* | 12/2014 | Gidwani | H04L 9/08 380/282 |
| 2015/0143125 | A1* | 5/2015 | Nix | H04W 52/0235 713/171 |
| 2015/0270955 | A1* | 9/2015 | Arnold | H04L 9/0631 380/30 |

OTHER PUBLICATIONS

Todd W. Arnold et al., "Intelligent Key Selection and Generation", U.S. Appl. No. 15/062,431, filed Mar. 7, 2016.

List of IBM Patents or Patent Applications Treated as Related; (Appendix P), Filed Sep. 1, 2016; 2 pages.

Todd W. Arnold et al., "Intelligent Key Selection and Generation", U.S. Appl. No. 15/248,566, filed Aug. 26, 2016.

* cited by examiner

INTELLIGENT KEY SELECTION AND GENERATION

BACKGROUND

The present invention relates generally to cryptographic operations, and more specifically, to intelligent key selection and generation.

A cryptographic operation controls access to information. Exemplary operations include encryption of data, generation of a digital signature, and generation of a message authentication code (MAC). In each case, performing the cryptographic operation involves using one key and the generation of a complementary key to retrieve or verify information. For example, encrypting data is an operation performed by using an encryption key and generating a complementary decryption key to retrieve the data.

SUMMARY

According to an embodiment, a computer program product for selecting and generating a key to perform a cryptographic operation includes a computer readable storage medium having program instructions embodied therewith that are readable by a processing circuit to cause the processing circuit to perform a method. The method includes receiving one or more inputs representing criteria for the key, the one or more inputs excluding an explicit identification of the key and one of the one or more inputs specifying the cryptographic operation; retrieving, from a memory device, information corresponding with the one or more inputs; selecting and generating the key based on the one or more inputs and the information; and performing the cryptographic operation using the key.

According to another embodiment, a method of selecting and generating a key to perform a cryptographic operation includes receiving one or more inputs representing criteria for the key, the one or more inputs excluding an explicit identification of the key and one of the one or more inputs specifying the cryptographic operation; retrieving, from a memory device, information corresponding with the one or more inputs; selecting and generating, using a processor, the key based on the one or more inputs and the information; and performing, using the processor, the cryptographic operation using the key.

According to yet another embodiment, a security system to select and generate a key to perform a cryptographic operation includes a memory device configured to store information corresponding with one or more inputs; and a processor configured to receive the one or more inputs, retrieve a portion of the information corresponding with the one or more inputs, select and generate the key based on the one or more inputs and the portion of the information, and perform the cryptographic operation using the key, the one or more inputs excluding an explicit identification of the key and one of the one or more inputs specifying the cryptographic operation.

BRIEF DESCRIPTION OF THE SEVERAL VIEWS OF THE DRAWINGS

The subject matter which is regarded as embodiments is particularly pointed out and distinctly claimed in the claims at the conclusion of the specification. The forgoing and other features, and advantages of the embodiments are apparent from the following detailed description taken in conjunction with the accompanying drawings in which:

DETAILED DESCRIPTION

As noted above, cryptographic operations involve the generation and use of a key and typically also result in the generation of another complementary key. The complementary key may be the same key that was initially generated to perform the cryptographic operation (e.g., encryption) but with different type information. The type information associated with a key dictates the permitted uses of the key. For example, the decryption key type is permitted to be used to decrypt information but not to encrypt other information. The key (referred to as a strongly-typed key) and associated type information are stored in a data structure referred to as a key token. The cryptographic operations are generally performed by a security module that implements an appropriate cryptographic algorithm. Currently, a user (e.g., one who wishes to encrypt a document) must specify the key to the used by the security module, obtain the key (e.g., encryption key), and then submit the data and the key to have the operation performed (e.g., submit the document to be encrypted along with the obtained encryption key). This procedure raises two issues that can be addressed by the embodiments discussed herein. First, the cryptographic operation is currently performed in two steps involving obtaining the key and then using the key to have the operation performed. Secondly, because the operator must specify the key to be obtained from the security module, an operator without proper knowledge or with malicious intent may specify a key that is incorrect for the intended use (e.g., insufficiently secure for the particular application). Embodiments described herein relate to intelligent key selection and generation. According to the embodiments, information regarding the cryptographic application, rather than a specification of a key, is provided to the security module. Further, the information is provided along with the data to be operated on. As a result, in one step, the security module according to embodiments selects the proper key, performs the cryptographic operation, and provides any complementary key (key token).

Figure 1:
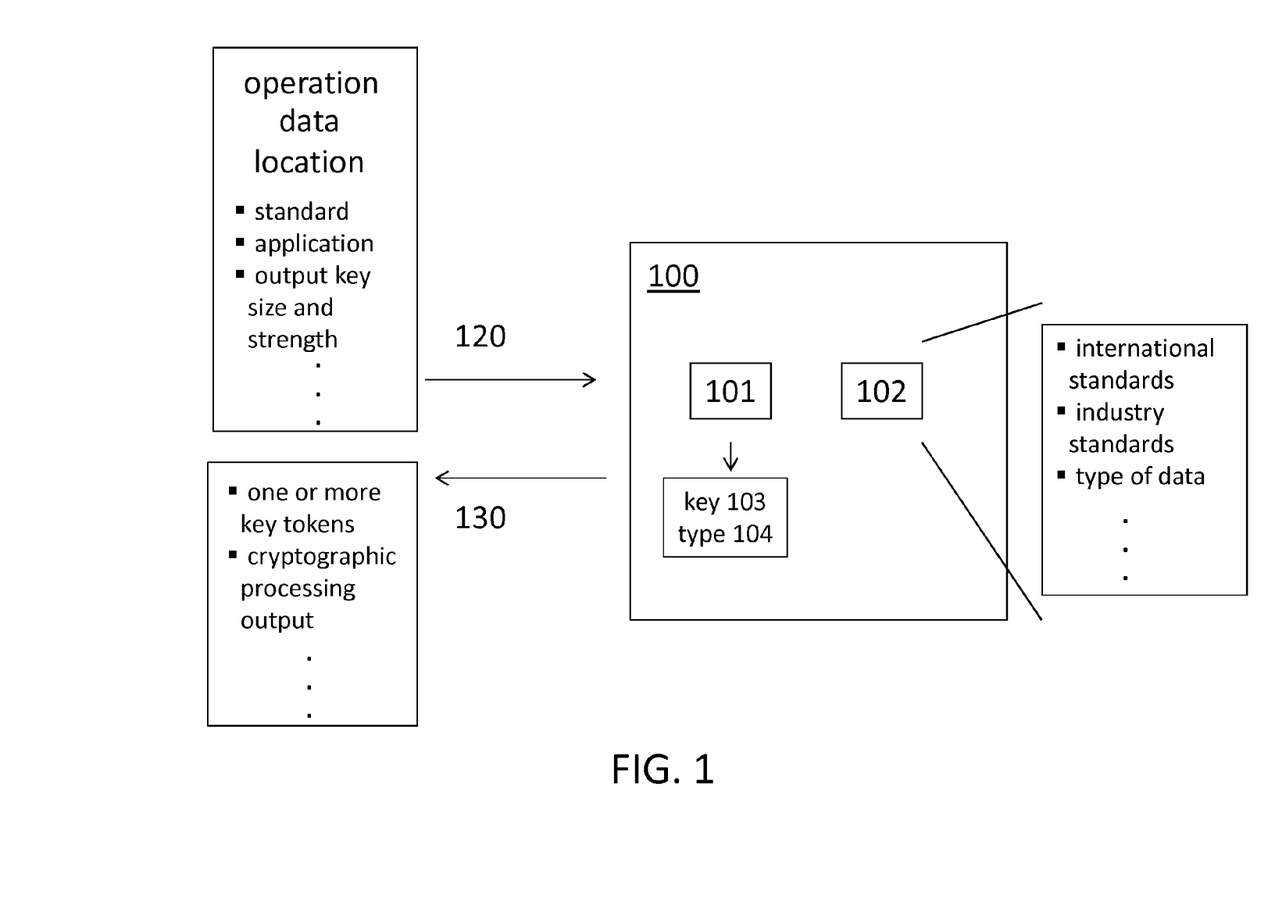
FIG. 1 is a block diagram of a system to perform key selection and generation according to embodiments.

FIG. 1 is a block diagram of a system 100 to perform selection and generation of a key 103 according to embodiments. The system 100 replaces a current system that provides the output 120 with different input 120 and, consequently, different processing within the system 100 to generate the output 130, as detailed herein. The system 100 includes one or more processors 101 and one or more memory devices 102 to carry out the selection of the key 103 and cryptographic processing. Some exemplary inputs 120 are shown in FIG. 1. Required inputs include an indication of the requested cryptographic operation and any data corresponding with the operation (this may additionally include an indication of the type of the data). For example, when encryption is the requested operation, the data is the data to be encrypted. The location to which to send or store the generated key 103 and the cryptographic operation results (e.g., encrypted data) may also be specified in the input 120. In addition to the operation and any data corresponding with the requested operation, an exemplary listing of criteria that may be included as input 120 to be used for selection of the key 103 is shown. These examples are not intended to be exhaustive and any combination of two or more of the inputs 120 may be provided to the system 100. One exemplary input 120 is a standard. The standard may be an international standard or industry standard. Another exemplary input 120 is an application. Exemplary applications include banking and online shopping. An exemplary input 120 may also include a specification of the size and strength of the key 103 used and output by the system 100. Another way that the output key 103 may be constrained is by specifying, in the input 120, an empty key token to receive the generated key 103. The specified key token may constrain the specific key generation or derivation algorithm used by the processor 101 of the system 100. The key 103 derivation inputs (discussed further with reference to FIG. 5 below) may be specified in the input 120, as well. Based on the input 120 and information stored in the memory device 102, the processor 101 of the system 100 selects the key 103 (which may be stored in memory 102) to complete the cryptographic operation.

Exemplary information that may be stored in the memory device 102 is shown in FIG. 1. Again, the listing is intended to be illustrative rather than exhaustive. Information that may be used to select a key 103 includes, for example, international standards. The appropriate international standard needed for the requested cryptographic operation (according to the input 120) may be selected from among stored international standards based on a specific request for a standard (as part of the input 120) or based on other information provided with the input 120 (e.g., application and a country of use). Industry standards may also be stored in the memory 102. As with the international standard, the required industry standard may be specified in the input 120 or may be selected from among industry standards that are stored in memory 102 based on other input 120 factors. The type of data provided as input 120, which may be indicated as part of the input 120 or determined by the system 100, may be other exemplary information of interest stored in the memory 102.

The memory 102 may be organized to store an indication of the appropriate key 103 in conjunction with each international standard, industry standard and data type. For example, according to one embodiment, the memory 102 may be organized as a look-up table. The associated standard may specify how the key 103 is to be generated. For example, a particular standard may require that the key 103 be generated according to NIST 800-90A Recommendation for Random Number Generation using a seed meeting specific criteria. Another standard from EMVCo may require that a key 103 be generated by encrypting an input piece of data using TDES and a particular Initialization Value—the result of each round of encryption being used to form part of the derived key 103. Still another criterion, ANSI Technical Report 31, requires a very particular wrapping key derivation from a base key that also involves a MAC key generation for a different part of the wrapping process: actually generating 2 keys on the fly via different methods. Specific examples are provided below to further explain the processing by the system 100. This processing includes selection and generation of the key 103 and type 104 of the key 103. A result of the system 100 is provided as output 130 that may include one or more key tokens (key 103 and type 104), discussed further below, and any cryptographic processing output (e.g., encrypted data when the requested operation in the input 120 is encryption).

Figure 2:
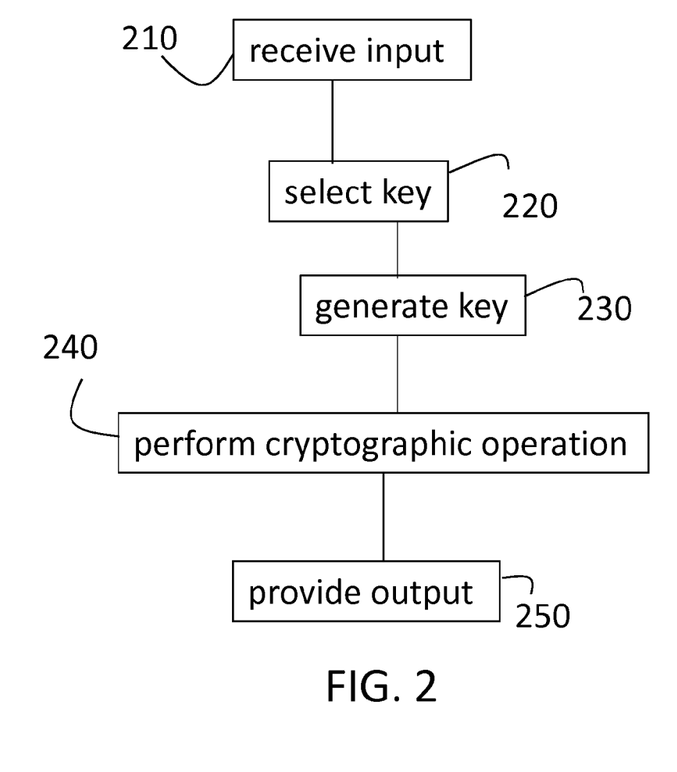
FIG. 2 is a process flow of the system to perform key selection and generation according to an embodiment.

FIG. 2 is a process flow of the system 100 to perform key 103 selection and generation according to an embodiment. At block 210, receiving input 120 includes receiving information about the cryptographic operation of interest, any data to be operated on, and other information discussed with reference to FIG. 1, such as data type, international standard, or application. Receiving input 120 at block 210 specifically excludes receiving a specification of a key 103 to be used by the processor 101 of the system 100. This key 103 selection is left to the system 100 according to the embodiments discussed herein. Selecting the key 103, at block 220, includes the processor 101 of the system 100 using the input 120 in conjunction with information stored in memory 102. The information stored in memory 102 may include, as discussed with reference to FIG. 1, a correspondence between different international and industry standards and data types, for example. Once the key is selected at block 220, generating the key 103, at block 230, includes generating a strongly-typed key, and performing the cryptographic operation indicated by the input 120, at block 240, includes performing encryption of data or generating a digital signature, for example. Providing the output 130, at block 250, includes providing any data associated with a result of the cryptographic operation (e.g., encrypted data) and a key token (key 103 and type 104). As noted above, the key token is a data structure that includes the key 103 and, additionally, type 104 information for the key 103. This is further discussed below with reference to the examples.

Figure 3:
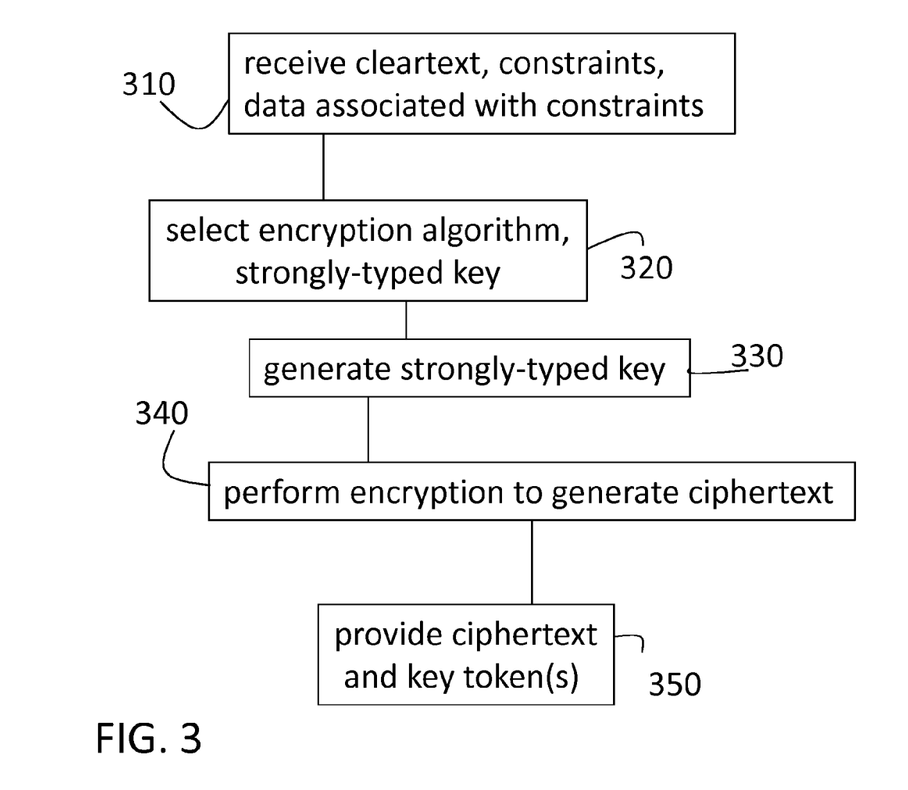
FIG. 3 is a process flow of the system performing an exemplary cryptographic operation according to an embodiment.

FIG. 3 is a process flow of the system 100 performing an exemplary cryptographic operation according to an embodiment. Specifically, the example shown in FIG. 3 relates to the system 100 performing an encryption operation. At block 310, the system 100 receives cleartext, which refers to the data to be encrypted, constraints, and any data associated with the constraints. For example, constraints may specify an industry standard and data associated with the constraints may specify the data (cleartext) being provided. Thus, the industry standard may be for the healthcare industry and the data associated with the constraint may specify that the cleartext includes patient health information. Selecting the encryption algorithm and strongly-typed key 103 at block 320 includes the processor 101 of the system 100 using the input 120 indicating, in the exemplary case, that patient health data needs to be encrypted in compliance with the healthcare industry standard. The particular key 103 selection at block 320 includes the processor 101 accessing the memory device 102 as needed. Generating the strongly-typed key 103, at block 330, includes the processor 101 generating the selected key 103 of the selected type 104 for performing the encryption to generate ciphertext, which is the encrypted cleartext, at block 340. At block 350, providing the ciphertext and one or more key tokens represents the system 100 providing output 130 based on the input 120.

As indicated at block 350, more than one key token (key 103 and type 104) may be provided by the system 100. The different key tokens may be referred to as variants of each other because the key 103 may be the same but may be wrapped or bound with different type 104 information to generate each key token. For example, if the encrypted data (cleartext) were a user's bank account number, two key tokens may be provided as output 130 by the system 100. One key token may include the key 103 and a type 104 that constrains the key 103 to only allow decryption of the bank account number (decrypt the ciphertext to obtain the cleartext, for example, by a business partner of the user) while another key token may include the key 103 and type 104 information that constrains the key 103 to be used in a personal identification number or numeric password generation process. As another example of key 103 variants, a user may create an encrypted file system such that the encrypted data (cleartext) is a superblock or initial block stored by the file system. In this case, two key tokens may be provided as output 130 from the system 100. One key token may constrain the key 103, based on the type 104 information, to only decrypt the superblock. Another key token may include type 104 information that constrains the key 103 to encrypt or decrypt blocks in the file system other than the superblock. Generation of key token variants is discussed further below with reference to FIGS. 4 and 5.

Figure 4:
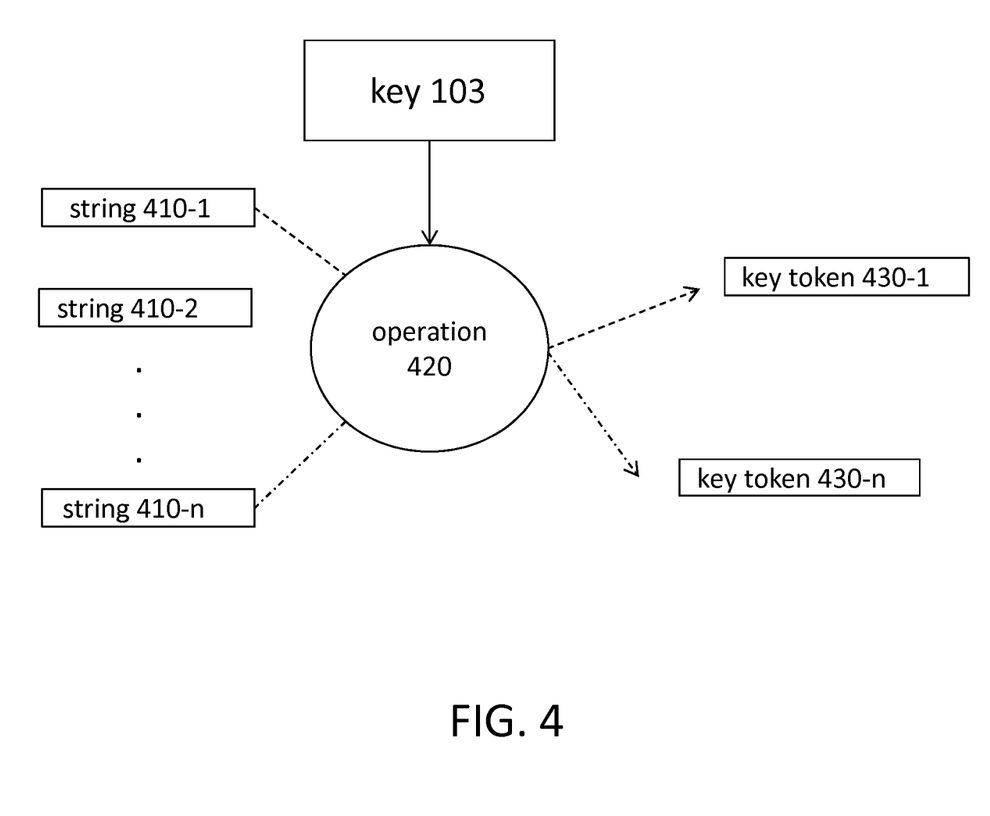
FIG. 4 illustrates generation of variant key tokens according to one embodiment.

FIG. 4 illustrates generation of variant key tokens according to one embodiment. According to the embodiment shown in FIG. 4, the processor 101 of the system 100 performs an operation 420 (e.g., XOR) using a string 410-1 through 410-*n* (generally referred to as 410) and the key 103. Each string 410 is constant and may be known publically. A different string 410 is used to generate each variant (each different type 104) of the secret key 103. As shown in the example at FIG. 4, the operation of string 410-1 with the key 103 generates one key token 430-1 while the operation of string 410-*n* with the key 103 generates a different key token 430-*n*.

Figure 5:
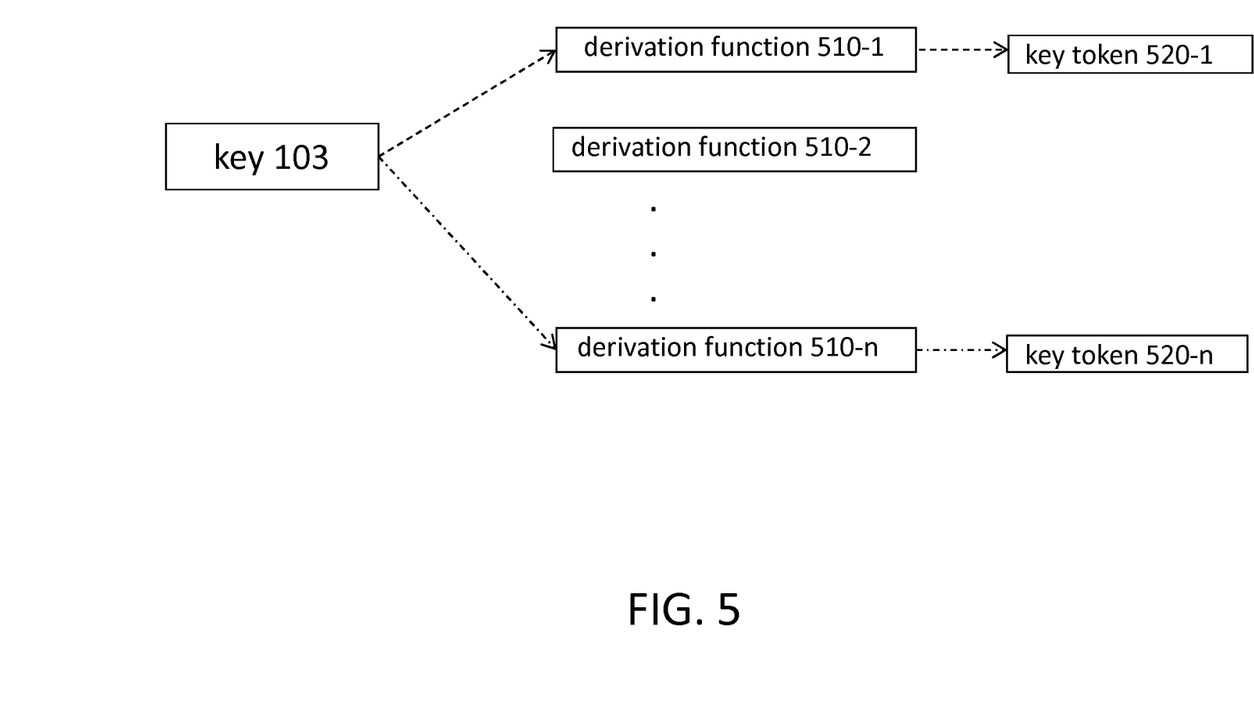
FIG. 5 illustrates generation of variant key tokens according to another embodiment.

FIG. 5 illustrates generation of variant key tokens according to another embodiment. The embodiment shown in FIG. 5 involves a set of one-way derivation functions 510-1 through 510-*n* (generally referred to as 510) to generate the variants. The derivation functions 510 may be one of a number of known key derivation functions that derive a key token from a key 103 or from other data. Each derivation function 510 may differ from the other derivation functions 510 based on a different input or a different path taken by the function, for example. As shown in FIG. 5, derivation function 510-1 may be used to generate key token 520-1 while derivation function 510-*n* may be used to generate key token 520-*n*.

Figure 6:
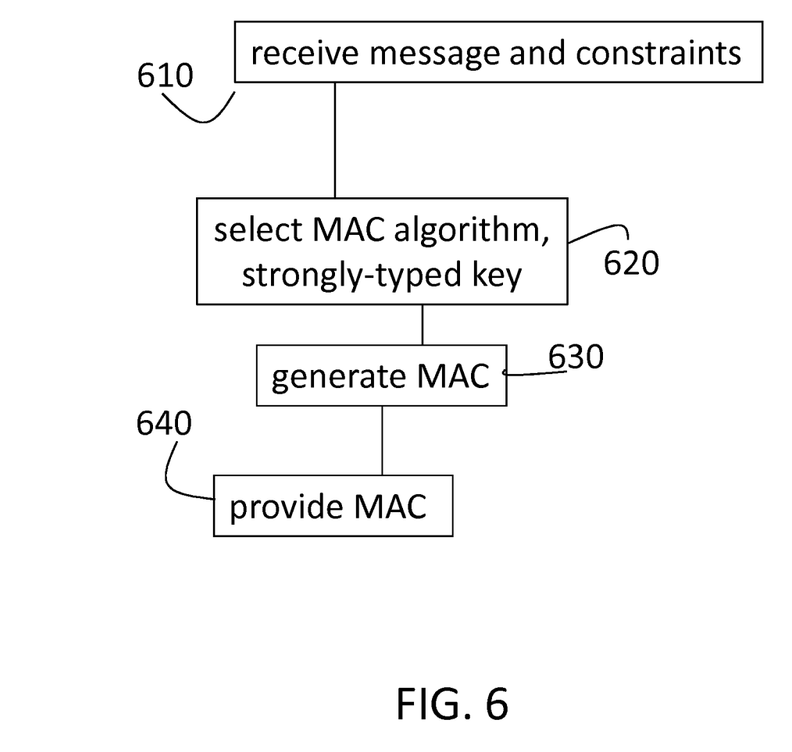
FIG. 6 is a process flow of the system performing another exemplary cryptographic operation according to an embodiment.

FIG. 6 is a process flow of the system 100 performing another exemplary cryptographic operation according to an embodiment. Specifically, the example shown in FIG. 6 relates to the system 100 performing generation of a message authentication code (MAC). At block 610, receiving the message and constraints as part of the input 120 includes receiving a specification of a standard, for example, or a location of where to send the message with the MAC after generation. The message is the message to be authenticated with the MAC. At block 620, selecting the MAC algorithm and strongly-typed key 103 facilitates generating the MAC, at block 630, using the selected MAC algorithm and strongly-typed key. Providing the MAC, at block 640, as an output 130 of the system 100 may be to the location specified in the input 120. A user receiving the message and accompanying MAC would use the system 100 (or similar system 100) to generate a MAC using the same key 103 and MAC algorithm and verify that the received MAC and generated MAC match.

Technical effects and benefits include appropriate key selection and one-step performance of key generation and cryptographic processing.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of selecting and generating a key to perform a cryptographic operation, the method comprising:
   receiving one or more inputs representing criteria for the key, the one or more inputs excluding an explicit identification of the key and the one or more inputs specifying the cryptographic operation;
   retrieving, from a memory device, information corresponding with the one or more inputs;
   selecting and generating, using a processor, the key based on the one or more inputs and the information;
   performing, using the processor, the cryptographic operation using the key; and
   generating, using the processor, a key token including an output key and a type of the output key.

2. The method according to claim 1, wherein the receiving the one or more inputs includes receiving one or more of a specification of an international standard, a specification of an industry standard, an indication of a type of data provided with a specification of the cryptographic operation, or a criteria for an output key, the retrieving the information includes retrieving an international standard or an industry standard, and the cryptographic operation includes one of an encryption, a digital signature generation, or a message authentication code generation.

3. The computer program product according to claim 1, further comprising generating two or more key tokens as variants, each of the two or more key tokens being generated based on an operation between a respective string and the output key.

4. The computer program product according to claim 1, further comprising generating two or more key tokens as variants, each of the two or more key tokens being generated based on a respective derivation function.

5. The computer program product according to claim 1, further comprising outputting a result of the cryptographic operation and the key token.

6. The computer program product according to claim 5, wherein the outputting is to a location specified by the one or more inputs.

7. A computer program product for selecting and generating a key to perform a cryptographic operation, the computer program product comprising:
   a computer readable storage medium having program instructions embodied therewith, the program instructions readable by a processing circuit to cause the processing circuit to perform a method comprising:
   receiving one or more inputs representing criteria for the key, the one or more inputs excluding an explicit identification of the key and the one or more inputs specifying the cryptographic operation;
   retrieving, from a memory device, information corresponding with the one or more inputs;
   selecting and generating the key based on the one or more inputs and the information; and
   performing the cryptographic operation using the key.

8. The computer program product according to claim 7, wherein the receiving the one or more inputs includes receiving one or more of a specification of an international standard, a specification of an industry standard, an indication of a type of data provided with a specification of the cryptographic operation, and a criteria for an output key.

9. The computer program product according to claim 7, wherein the retrieving the information includes retrieving an international standard or an industry standard, and the cryptographic operation includes one of an encryption, a digital signature generation, or a message authentication code generation.

10. The computer program product according to claim 7, wherein the method further comprises generating a key token including an output key and a type of the output key.

11. The computer program product according to claim 10, wherein the method further comprises generating two or more key tokens as variants, each of the two or more key tokens being generated based on an operation between a respective string and the output key.

12. The computer program product according to claim 10, wherein the method further comprises generating two or more key tokens as variants, each of the two or more key tokens being generated based on a respective derivation function.

13. The computer program product according to claim 10, wherein the method further comprises outputting a result of the cryptographic operation and the key token.

14. The computer program product according to claim 13, wherein the outputting is to a location specified by the one or more inputs.

15. A security system to select and generate a key to perform a cryptographic operation, the system comprising:
a memory device configured to store information corresponding with one or more inputs; and
a processor configured to receive the one or more inputs, retrieve a portion of the information corresponding with the one or more inputs, select and generate the key based on the one or more inputs and the portion of the information, and perform the cryptographic operation using the key, the one or more inputs excluding an explicit identification of the key and one of the one or more inputs specifying the cryptographic operation.

16. The system according to claim 15, wherein the one or more inputs includes one or more of a specification of an international standard, a specification of an industry standard, an indication of a type of data provided with a specification of the cryptographic operation, or a criteria for an output key, the information includes an international standard or an industry standard, and the cryptographic operation includes one of an encryption, a digital signature generation, or a message authentication code generation.

17. The system according to claim 15, wherein the processor generates a key token including an output key and a type of the output key.

18. The system according to claim 17, wherein the processor generates two or more key tokens as variants based on an operation between a respective string and the output key or based on a respective derivation function.

19. The system according to claim 17, wherein the processor outputs a result of the cryptographic operation and the key token.

* * * * *